April 5, 1932.     C. H. MACKEY ET AL     1,852,465
SEAT
Filed Sept. 3, 1929     2 Sheets-Sheet 1

INVENTORS.
Clarence H. Mackey &
George W. Weng.
by Parker & Prochnow
ATTORNEYS.

April 5, 1932.  C. H. MACKEY ET AL  1,852,465
SEAT
Filed Sept. 3, 1929  2 Sheets-Sheet 2
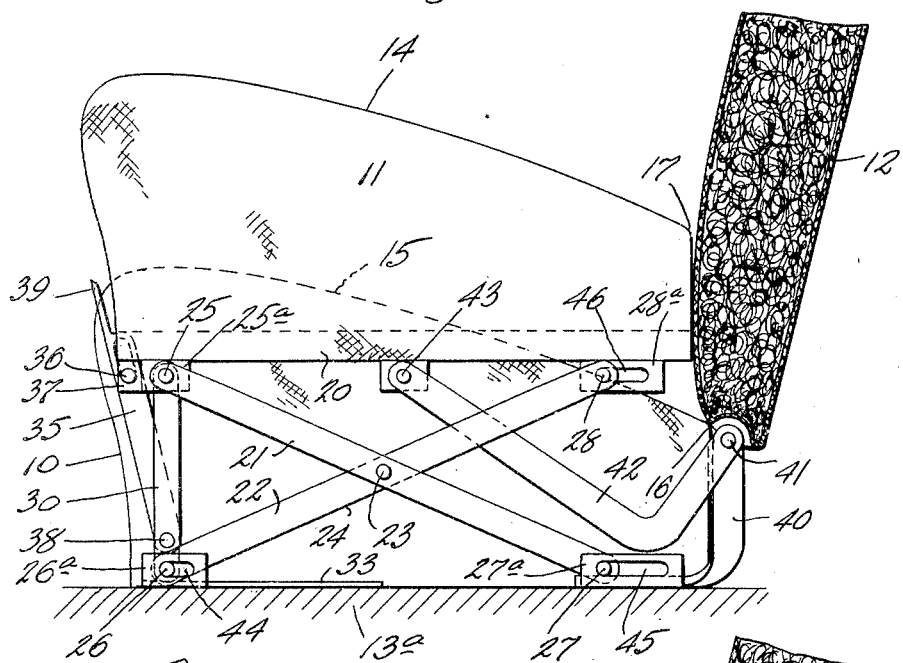
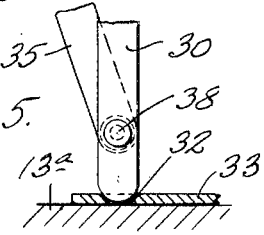
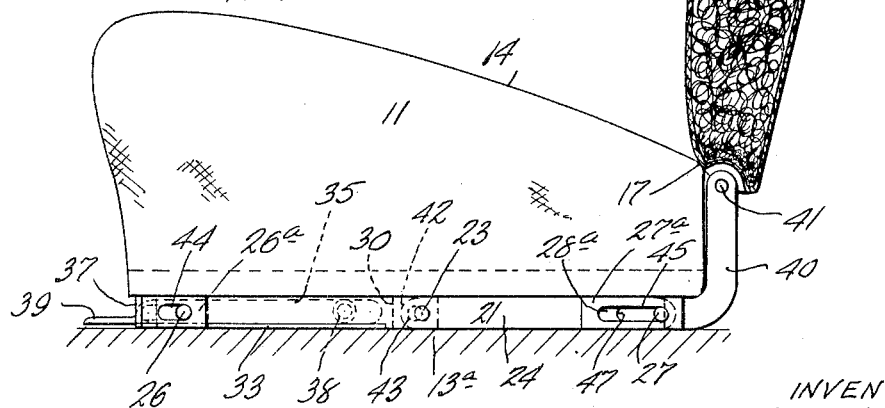
INVENTORS
Clarence H. Mackey
George N. Meng
by Parker & Prochnow
ATTORNEYS.

Patented Apr. 5, 1932

1,852,465

UNITED STATES PATENT OFFICE

CLARENCE H. MACKEY AND GEORGE W. WENZ, OF LANCASTER, NEW YORK

SEAT

Application filed September 3, 1929. Serial No. 390,186.

This invention relates to an improvement in seats, and more particularly to the provision of a movable section which can be shifted into an offset position relatively to other sections of the seat to form an arm rest.

In automobiles, for example, having a seat which can be occupied by three persons, it is desirable, when only one or two persons are occupying this seat, to provide an arm rest intermediate of the ends of the seat for the comfort of said person or persons.

An object of the invention, therefore, is to provide a novel and improved seat for use in automobiles or other places.

Another object is to provide a seat having one or more stationary sections and a section which normally extends continuously with said stationary section or sections and forms a part of the seat and which is movable into another position relatively to the other section or sections of the seat to form an arm rest.

Other objects are to provide an improved seat having a section which normally occupies a position between or at one side of other sections of a seat and forms a part of said seat, and in which position it has the appearance of being a continuous part of said seat, and which may be easily and quickly moved out of its normal position into an offset position for use as an arm rest; also to provide a movable section, the movements of which to and from its arm rest position can be effected by a simple movement of translation; also to provide means for shifting the movable seat section which may be concealed beneath or back of the movable section so as to be inconspicuous when the section is in its offset position, and which will be entirely concealed by said section when the latter is occupying its normal position.

In seats of the character described it is usual, in addition to the portions forming the seat surface, to provide a back section, and the face of this back section usually bulges out and overhangs the rear edges of the seat section.

Another object of the invention therefore is to provide an improved seat having a section which is movable into and out of a position in which it forms an arm rest and is so constructed and mounted that it can avoid interference with the overhanging face of said back section during such movements.

Other objects and advantages of this invention will appear from the appended description and claims.

In the accompanying drawings:

Fig. 3 is a transverse, vertical section of the seat showing the movable section thereof in elevation in its offset position forming an arm rest.

Fig. 4 is a similar view with the movable section in its normal position, forming part of the seat surface.

Fig. 5 is a detail showing the leg or prop used for maintaining the movable section in its offset position.

Figure 1:
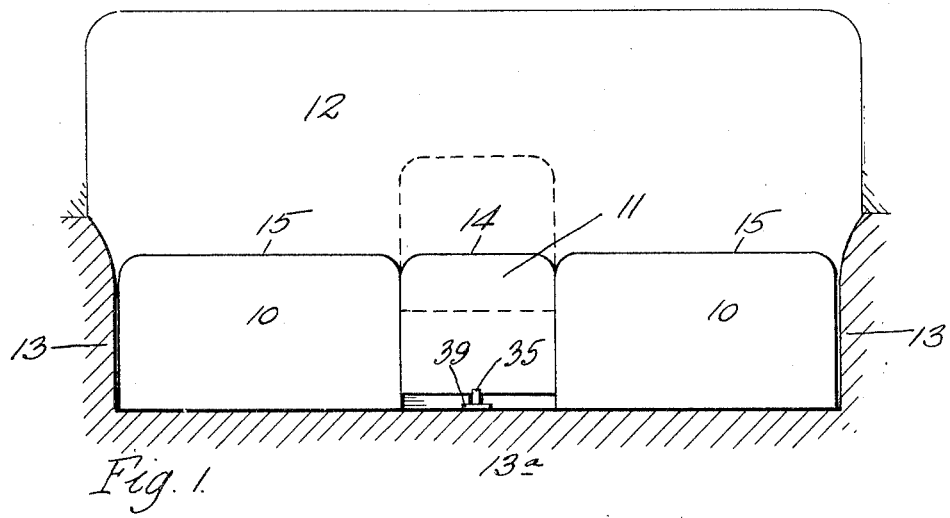
Fig. 1 is a front elevation of an improved seat embodying our invention, showing the base or support on which it is mounted partly in section.
Figure 2:
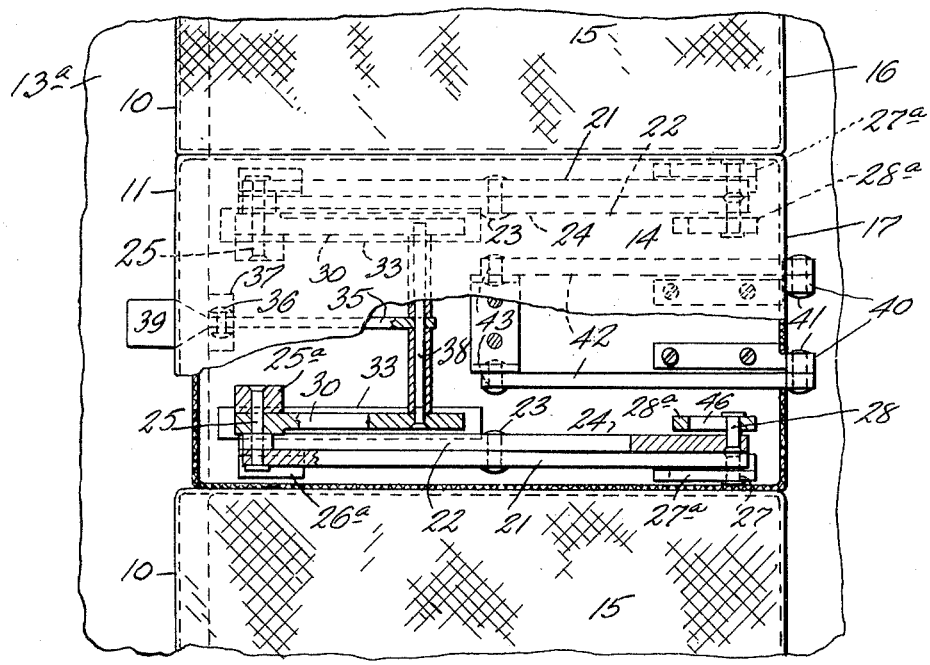
Fig. 2 is a fragmentary plan view showing the movable section of the seat partly broken away and in section, and with the back section omitted.

In the particular construction shown in the drawings, our improved seat includes two relatively stationary, outer sections 10, separated by an intermediate section 11. These three sections extend between the usual side walls or frame 13 of the vehicle, and rest on a base or floor 13a. The seat is further provided with the usual back section 12 which preferably extends entirely across the vehicle from one side of the frame 13 to the other.

The intermediate seat section 11 is movably disposed between the sections 10 and can be projected or moved to the offset position shown in dotted lines in Fig. 1 and in full lines in Fig. 3 to form an arm rest. This section 11, as shown in Fig. 3 is preferably of the same cross section shape as the two sections 10 so that when occupying its normal position between the latter, its top surface 14 will extend substantially continuous with the corresponding top surfaces 15 of the two sections 10, and forms therewith an unobstructed seat of usual form.

In such normal position of the parts, the back section 12 overhangs or bulges outwardly over the back edges 16 and 17, respectively of the seat sections 10 and 11, as shown in Fig. 4.

The mechanism for shifting the movable section 11 to its offset position, supporting it in such position, and returning the same to its normal position, can be of any suitable construction, one desirable arrangment being shown in the drawings, and which is constructed as follows:

Adjacent each side edge 20 of the movable section and beneath the latter, and extending from front to rear of the sections, is arranged a pair of links 21 and 22 which are pivoted intermediate of their ends 23 in the form of lazy tongs 24.

The front extremities of the links 21 and 22 are connected by pivots 25 and 26 respectively to brackets 25a and 26a which are fixed respectively to the bottom of the movable section and to the base 13a, while the rear extremities of said links are connected by pivots 27 and 28 to brackets 27a and 28a fixed to the base 13a and movable section 11 respectively.

It will be seen that by extending the lazy tongs from the collapsed position shown by Fig. 4 to the open position shown in Fig. 3, the section 11 is shifted upwards by a direct movement of translation to an offset position wherein its top face 14 is positioned above the corresponding face of the section 10 in a convenient position to form an arm rest.

For extending the lazy tongs 24 to elevate the section 11 and in order to firmly support the section in this position and prevent the collapse of the lazy tongs 24, suitable interponents such as the crops or members 30 are provided which are disposed between the section 11 and the base 13a. Two of these props 30 are shown, and they are preferably pivotally mounted at their upper or outer ends on the pivots 25 between the corresponding ends of the links 21 and the brackets 25a. When the lazy tongs 24 are extended as in Fig. 3, the props 30 are moved to an upright position, in which position their lower or inner ends are adapted to rest in seats 32 formed in wear plates 33 on the base 13a so as to prevent unintentional displacement of the props and consequent collapse of the arm rest.

In the construction shown, the props 30 are preferably disposed adjacent the front of and beneath the section 11, and suitable operating means are provided which are accessible from the front of the seat for actuating the props 30 to engage them in or release them from their seats 32 when it is desired to elevate or lower the arm rest.

The operating means shown comprises a lever 35 pivoted near one end by a pivot 36 to a lug or part 37 secured to the movable section 11 beneath the front edge thereof. The lower, inner end of the lever 35 is in turn pivoted to a cross transverse rod 38 extending between and connected to the lower ends of the props 30. The upper or outer end of the lever 35 is provided with a handle 39 which may be grasped from the front end of the seat to swing it about its pivot 36 for effecting the desired movement of the props 30 to move them into or out of supporting position.

Owing to the fact that the face of the back section 12 overhangs the rear edges of the several seat sections when the latter are in normal position, it is desirable to provide means whereby, when the movable section is shifted by a movement of translation, as described, that the movable section may also have a forward and upward movement relatively to the back section 12 so as to clear said overhanging face during such movement.

In the construction shown for this purpose, there is provided at the rear of the seat and beneath the back section 12 a pair of fixed uprights 40, to the upper ends of which are pivoted at 41, the rear ends of a pair of angular links 42. The upper ends of these links are in turn connected to the under-side of the movable seat section 11 by pivotal connections 43. When, therefore, the movable section is shifted from its normal position to its upper or offset position, the links 42 will swing about their pivots 41 and cause an upward and forward movement of the section 11, such as to permit the rear end of the section 11 to clear the overhanging face of the back section 12. Any other suitable means may be provided for this purpose.

As a result of the above mentioned movement of the section 11, as effected by the links 42, it is necessary to provide a lost motion connection between certain of the pivots of the lazy tongs 21 and 22, and the respective brackets. This is effected, in the construction shown, by mounting the pivots 26, 27 and 28 in slots 44, 45 and 46 in the corresponding brackets 26a, 27a and 28a, see Fig. 3. Thus, while a forward and rearward displacement of the lazy tongs about their remaining pivots 25 occurs in the upward and downward movements of the section 11, the latter is nevertheless rigidly supported in its elevated position by the engagement of the pivots 26 in the outer ends of the slots 44, in cooperation with the props 30.

By means of the described invention, a seat is provided which, under normal conditions form a continuous seat affording an unbroken surface, unobstructed by any projecting parts. When desired, however, a section of this seat can be instantly moved to an offset position for use as an arm rest. The mechanism for effecting the movements of the arm rest section are simple and rugged, and are concealed beneath the arm rest so as not to mar the appearance of the seat.

The improvement in seats described herein enables seats of standard form to be provided with a movable arm rest at slight additional cost over that of a companion seat not provided with such a rest.

The embodiment of this invention shown in the drawings illustrates the use of the improved seat in connection with an automobile, wherein the movable section forms an intermediate part of the seat surface, but it should be understood that the invention is not limited to use in connection with automobiles or other vehicles, and we desire that it be also understood that while the movable section is shown and disclosed as forming a part of the seat surface, this section could form a part of some other portion of the seat, such, for example, as the back thereof.

We claim as our invention:

1. A seat having a plurality of sections which normally occupy a position side by side to form a continuous seat, a base adjacent said seat, one of said sections being movable to an offset position relatively to said other section to form a rest, lazy tongs interposed between said movable section and said base and pivotally connected at their extremities to both, operating means for extending said lazy tongs to move said section, a prop movably connected to said lazy tongs, a fixed part on said base engageable by said prop for firmly holding said lazy tongs when moved to their extended position whereby said section is supported in its offset position on the extremities of said lazy tongs, and said operating means being movably connected to said prop for shifting said prop into and out of operative relation to said fixed part.

2. A seat having a plurality of sections which normally occupy a position side by side to form a continuous seat, a base adjacent said seat, one of said sections being movable to an offset position relatively to said other section to form a seat, lazy tongs interposed between said movable section and said base and pivotally connected at their extremities to both, operating means for extending said lazy tongs to move said section, a prop pivoted to the movable section and which is movable to a position for firmly holding said lazy tongs in extended position whereby said section is supported in its offset position on the extremities of said lazy tongs, and said operating means being connected to said prop and disposed so as to be accessible at a side of said section for shifting said prop to release said lazy tongs for returning said section to its normal position.

3. A seat including a base and a plurality of sections which normally occupy a position side by side to form a continuous seat and one of which sections is movable relatively to the others, mechanism for shifting said section including lazy tongs pivotally connected respectively to said base and to said movable section, operating means for actuating said lazy tongs to shift said section in an upward direction, and a member also pivoted to said base and to said section which, when said section is moved upwardly by said lazy tongs, acts to move said section simultaneously in a forward direction, and certain of the pivots of said lazy tongs having a slotted connection with said movable section and said base to enable said forward movement of said section to take place.

CLARENCE H. MACKEY.
GEORGE W. WENZ.